United States Patent
Grylls et al.

(12) 
(10) Patent No.: US 6,485,792 B1
(45) Date of Patent: Nov. 26, 2002

(54) ENDURANCE OF NIA1 COATINGS BY CONTROLLING THERMAL SPRAY PROCESSING VARIABLES

(75) Inventors: Richard John Grylls, Albuquerque, NM (US); Joseph David Rigney, Milford, OH (US); Matthew David Saylor, Blanchester, OH (US); Theodore Robert Grossman, Hamilton, OH (US); Yuk-Chiu Lau, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/644,491

(22) Filed: Aug. 23, 2000

Related U.S. Application Data

(60) Provisional application No. 60/151,111, filed on Aug. 27, 1999.

(51) Int. Cl.$^7$ ............................. C23C 4/06; C23C 4/18
(52) U.S. Cl. ................. 427/456; 427/376.8; 427/383.7
(58) Field of Search .............................. 427/456, 383.7, 427/376.8

(56) References Cited

U.S. PATENT DOCUMENTS

| | | | | |
|---|---|---|---|---|
| 4,610,736 A | * | 9/1986 | Barrett et al. ............... | 148/429 |
| 5,741,556 A | * | 4/1998 | Taylor et al. ............... | 427/453 |
| 5,824,423 A | * | 10/1998 | Maxwell et al. ............ | 428/623 |
| 6,129,991 A | * | 10/2000 | Warnes et al. .............. | 428/610 |

FOREIGN PATENT DOCUMENTS

JP 57-32347 * 2/1982

OTHER PUBLICATIONS

Thermal Spraying: Practice, Theory, and Application, American Welding Society, Inc., pp. 60 and 94–95, 1985. (no month date).*

* cited by examiner

*Primary Examiner*—Katherine A. Bareford
(74) *Attorney, Agent, or Firm*—David L. Narciso; McNees Wallace & Nurick LLC; Carmen Santa Maria

(57) ABSTRACT

A method for applying substantially stoichiometric NiAl to the surface of a superalloy substrate. These coatings are applied to substrates subjected to high temperatures and thermal cycling by providing a powder of the substantially stoichiometric material with the desired minor additions of rare earth elements, Cr or Zr. The coatings are applied by a thermal spray process utilizing hydrogen as a fuel while generating a highly reducing flame. The thermal spray method melts the powder and directs it onto the surface of the turbine component that is to be coated. The powder size is carefully controlled to prevent oxidation of the powder while providing a controlled surface finish. The surface roughness of the bond coat is further mechanically worked to a predetermined surface finish prior to application of the ceramic thermal barrier layer by a PVD method. Thermal barrier systems applied using these carefully controlled predetermined parameters provide outstanding resistance to TBC spallation under conditions of high cyclic stresses.

17 Claims, 2 Drawing Sheets

ENDURANCE OF NIA1 COATINGS BY CONTROLLING THERMAL SPRAY PROCESSING VARIABLES

CROSS REFERENCE TO RELATED APPLICATION

This application claims the benefit of U.S. Provisional Application No. 60/151,111, filed Aug. 27, 1999.

BACKGROUND OF THE INVENTION

Components operating in the gas path environment of gas turbine engines are subjected to significant temperature extremes resulting from the changing power requirements during engine operation. In addition, the hot gases of combustion provide a corrosive and oxidative environment for these components. Without implementing protective mechanisms for the superalloys comprising these components, the alloys would have a shortened life span.

In order to protect these components from the deleterious effects of both the significant temperature extremes and the corrosive and oxidative environments at elevated temperatures, it has become common practice to coat these components with materials that are more capable of withstanding the hot, corrosive and oxidative environments. To provide these protections, environmental coatings typically are applied over the base metals comprising the components. The environmental coatings typically are metallic systems. These base metals typically are superalloys based on nickel, cobalt and combinations thereof, and the environmental coatings are typically aluminides or MCrAlYs. To improve the thermal performance of the component, thermal barrier coatings (TBCs) may be applied over the environmental coatings to form a thermal barrier system. Typically, these thermal barrier coatings are yttria-stabilized zirconia (YSZ).

The environmental coatings may be applied by any one of a number of methods. One method is to expose the component at an elevated temperature to an atmosphere rich in preselected elements, typically aluminum. The environmental coating is then grown by a diffusion process as nickel or cobalt from the superalloy substrate diffuses outwardly from the substrate and Al diffuses inwardly to form an aluminum enriched region at the surface of the component. Another method is to apply a thin coating of an element such as platinum to the surface of the component prior to the aluminiding treatment by submersing the component in an electroplating bath of metallic ions of the element. Application of a voltage and the resulting current causes metallic ions to be deposited onto the component. The protective coating can be formed by a subsequent diffusion treatment. The third commonly used method for applying coatings is by thermal spray techniques. Thermal spray methods include detonation gun (D-gun), high velocity oxy-fuel (HVOF), air plasma spray (APS) and low pressure plasma spray (LPPS). The bond coat may also be applied by physical vapor depositing methods such as electron beam and magnetron sputtering. While the specific thermal spray methods vary, each of the methods does not significantly alter the surface of the substrate material by melting substrate material and mixing it with bond coat material. These thermal methods utilize a powder of a preselected composition, which is melted or partially melted and deposited on the substrate surface.

Substantially stoichiometric NiAl with small additions of other elements have been shown to exhibit outstanding oxidation resistance and resistance to TBC spallation. Such compositions are primarily beta phase NiAl and comprise substantially different compositions than have been applied conventionally in commercial applications. For example, pending patent application 13DV-13334, U.S. Ser. No. 09/608,114, filed Jun. 30, 2000, now U.S. Pat. No. 6,291,084, assigned to the assignee of the present invention discloses a β-phase-NiAl having 30–60 atomic percent Al that includes small additions of Zr from, in atomic percent, from 0.1–1.2% and Cr from, in atomic percent 2–15%. This substantially stoichiometric NiAl has improved spallation resistance when used as a bond coat in a high temperature environment in which the component is subjected to severe thermal stresses and cycling, such as rotating components found in the hot sections of a gas turbine engine. Cr is included as a solid solution strengthener, but may also form fine α-Cr phases and β Heusler phases disposed within the protective NiAl β-phase. The small amounts of Cr are believed to promote the formation of α-alumina at the surface of the bond coat. The small amount of Zr preferentially oxidizes at the coating surface forming "pegs" that increase the mechanical integrity of the alumina scale along the bond coat surface by creating an irregular or roughened surface, thereby increasing resistance to crack propagation. The application suggests that such coatings can possibly be applied by thermal spray, but teaches that the coatings are advantageously applied by electron beam physical vapor deposition (EBPVD) or by magnetron-sputtered PVD followed by a heat treatment in the range of 1800–2000° F. for 24 hours to diffuse the coating with the underlying substrate.

Diffusion processes yield graded coatings in which the composition of the NiAl will vary from the outer, coated surface of the turbine component into the substrate of the turbine component. In order to take advantage of the improved oxidation resistance and resistance to TBC spallation while using existing technology, such beta-phase coatings of NiAl may best be applied using thermal spray techniques rather than using the PVD techniques suggested by the copending application. However, considerable difficulty may be encountered in attempting to apply such coatings to a turbine component. These difficulties may be traced to the processing variables inherent in the thermal spray processes, which in turn can affect the integrity of such substantially beta-phase NiAl-based coatings.

While PVD techniques are available for application of a beta-phase NiAl, what is lacking in the art are teachings with regard to thermal spray methods for depositing a composition of primarily beta-phase NiAl, with optional additions of rare earth and other elements, that will provide a bond coat with a fully developed metallurgical bond with minimal diffusion between the bond coat and the substrate that has substantial cleanliness with very little porosity while providing outstanding resistance to oxidation and resistance to TBC spallation.

BRIEF SUMMARY OF THE INVENTION

Environmental coatings comprising primarily beta-phase NiAl with small additions of rare earth elements provide outstanding oxidation resistance to turbine components to provide additional environmental protection. As used herein, the term "substantially stoichiometric NiAl" means a primarily beta-phase NiAl composition that includes small additions of rare earth elements and other elements such as Cr, such that the beta phase matrix may include small amounts of other phases, such as fine α-Cr and β'-Heusler phases. Frequently these applied environmental coatings are also used as bond coat to promote improved adhesion between dissimilar metallic substrates and ceramic thermal barrier coatings that are applied to improve the thermal response of the component. Substantially stoichiometric NiAl also provides outstanding resistance to TBC spallation. These coatings are applied to hot section turbine components by providing a powder of the substantially stoichiometric material with the desired minor additions of rare earth elements, Cr or Zr. The coatings are applied by a thermal spray process utilizing hydrogen as a fuel. The thermal spray melts the powder and directs it onto the surface of the turbine component that is to be coated. Thus, the process is accomplished by adding material to the surface of the substrate component, typically a cobalt-based or nickel-based superalloy component. Because the thermal spray process utilizing hydrogen as a fuel minimally affects the alloy substrate by melting, the added material is bonded to the surface by a combination of metallurgical and mechanical bonding. It is necessary to provide a subsequent heat treatment to fully develop the metallurgical bond between the thermally sprayed coat and the underlying substrate.

The coating process must be carefully controlled to assure that a high quality coating is achieved. To achieve a high quality coating by thermal spray, it is important to control the processing parameters of the thermal spray. The flame conditions are controlled using a non-oxidizing hydrogen flame to prevent detrimental oxidation of the coating. The powder size is screened to provide a preselected size powder in the range of 10 to 44 microns. Coating thickness is controlled to provide an added preselected thickness between about 0.1 mil to about 12 mils. Because the thermal sprays can provide a somewhat rough surface finish, the coating performance is improved by reducing the surface roughness to provide a smoother surface profile. The subsequent heat treatment can also affect the ability of the coating to form a sound metallurgical bond with the substrate. Thus, the parameters of the subsequent heat treatment must be carefully controlled.

When each of the above parameters are carefully controlled, a high quality, substantially stoichiometric NiAl coating advantageously can be achieved. Such a coating provides the additional advantage of having an improved furnace cycle life, which is a well-accepted indication of improved length of life when in service in a gas turbine engine.

Another advantage of the present invention is that the processes used can be applied to both new engine components and to refurbish components removed from service in a gas turbine engine.

Another advantage of the present invention is that thermal spraying procedures of the present invention can be utilized to produce turbine airfoil components having the same spallation resistance more quickly and less expensive than other available processes.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Whenever possible, the same reference numbers will be used throughout the figures to refer to the same parts.

DETAILED DESCRIPTION OF THE INVENTION

Figures 1, 2, 3:
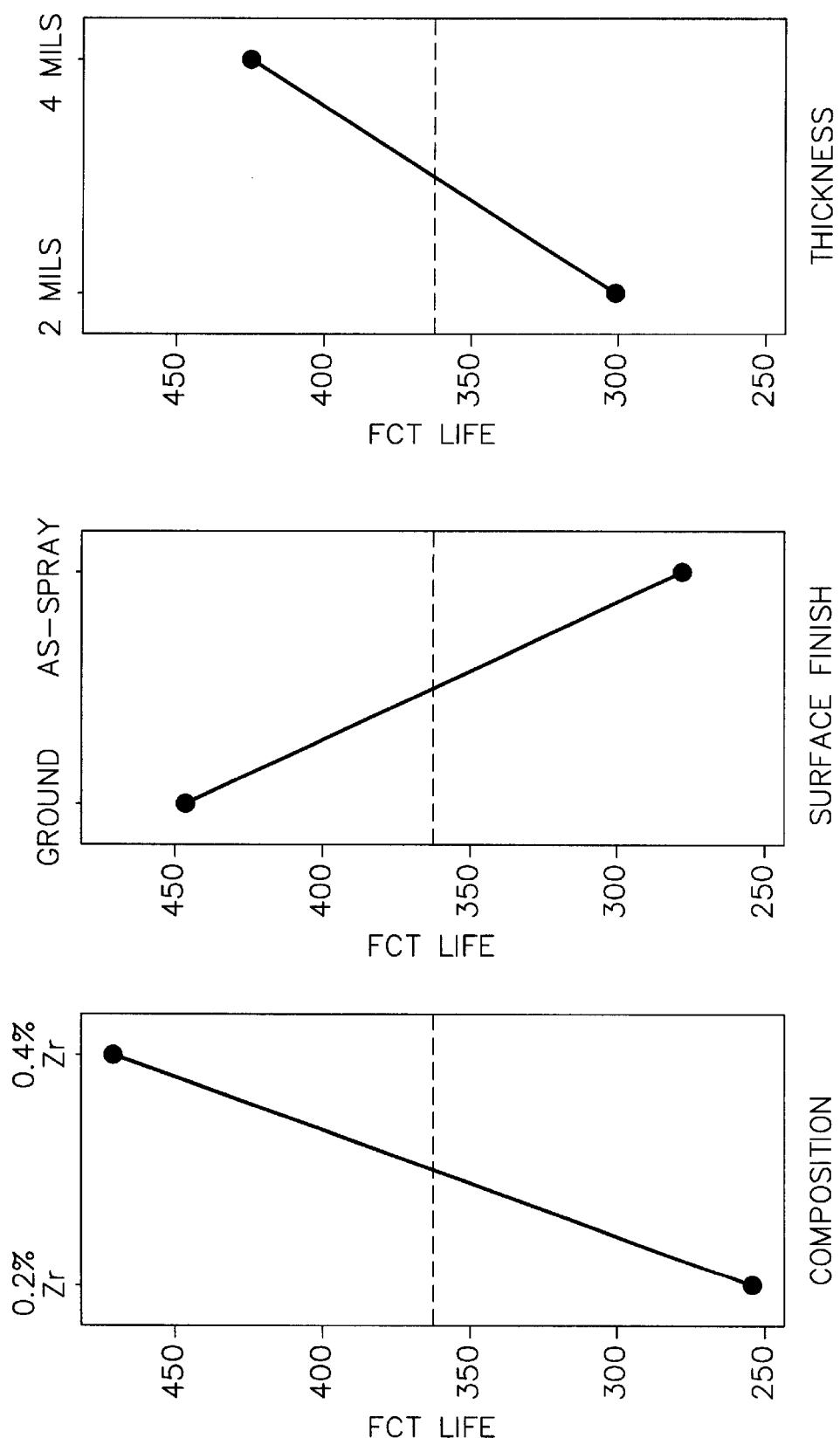
FIG. 1 is a graph that depicts the effect of small amounts of Zr on FCT Life of a thermal barrier coating system using a NiAl bond coat applied by HVOF.
FIG. 2 is a graph that depicts the effects of surface finish on the FCT Life of a thermal barrier coating system using a NiAl bond coat applied by HVOF.
FIG. 3 is a graph that depicts the effects of coating thickness on the FCT Life of a thermal barrier coating system using a NiAl bond coat applied by HVOF.

Substantially stoichiometric NiAl coatings provide outstanding oxidation resistance when used as an environmental coating and improved resistance to thermal barrier coating (TBC) spallation when used as a bond coat between a turbine article substrate, such as a turbine blade, and an overlying TBC. Although NiAl-based have long been used for bond coats and protective environmental coats, the methods used to apply these NiAl-based coatings and variations of these coatings containing additional alloying elements, such as for example, platinum, have largely been as diffusion coatings. Diffusion coatings are applied, for example, by exposing the substrate to a gaseous phase of aluminum. The substrate of a turbine component is typically a nickel-based or cobalt-based material. Substrate materials often used in turbine parts or airfoils for aircraft engines and power generation equipment may include nickel, cobalt, or iron based superalloys. The alloys may be cast or wrought superalloys. Examples of such substrates are GTD-111, GTD-222, Rene 80, Rene 41, Rene 125, Rene 77, Rene 95, Rene N5, Rene N6, Inconel 706, Inconel 718, Inconel 625, cobalt-based HS-188, cobalt-based L-605 and stainless steels. These materials are used for turbine components such as turbine blades, turbine vanes, turbine buckets, nozzles, and the like. Aluminum, deposited on the surface of the turbine component, is diffused into the surface at an elevated temperature. A very thin coating of alumina, preferably continuous, forms over the outer surface. The diffusion aluminide coating is formed as the aluminum diffuses inwardly and the nickel and/or cobalt from a nickel-based or cobalt-based material diffuse outward. The formation of the coating is driven by kinetics, and the coating is grown by the combination of the diffusion reactions. Clearly, when a coating is formed in this manner, it is difficult to control the exact composition of the coating at and in the vicinity of the surface. Of particular difficulty is the controlled deposition of rare earth elements that may be added to enhance oxidation resistance or spallation resistance. Although NiAl or CoAl will form, the exact chemical composition at and near the surface will be difficult to control. Additionally, the superalloys also include a number of other elements that also diffuse outwardly and combine with both Ni and Al as well as with each other, so that, the composition at the surface will change gradually over time, and may vary from location to location on the surface at any particular time. Some of these elements may be undesirable and, as has been documented, may actually be detrimental to the coating, contributing to premature spallation.

Currently, the best method for applying a substantially stoichiometric coating of NiAl is to apply a powder having a predetermined chemistry using a thermal spray process. Because thermal spray processes are controlled to prevent or minimize the melting of the substrate while the powder, in a molten, semi-molten or softened form, of substantially stoichiometric composition is propelled toward the substrate surface, there is little or no mixing of the powder of substantially stoichiometric composition with the substrate composition, so that the desired powder composition is not diluted in molten substrate.

Because of the many variables that can affect the quality of a coating applied by a thermal spray process, it is important to control the parameters of the process to obtain a coating of the desired characteristics, as small variations in the parameters can yield a coating having different properties. Because substantially stoichiometric NiAl, like stoichiometric NiAl, is brittle at ambient temperatures with little tensile ductility, it is important to control the parameters to prevent degradation of the applied coating and further affect the material properties.

The composition of substantially stoichiometric NiAl drastically affects the furnace cycle test (FCT) life of the coating. FCT life testing is a commonly used test to determine the endurance of a coating. The coating is covered with a TBC and cycled to a temperature of about 2125° F. and cooled. This cycle is repeated until the TBC spalls from the coating. The effects of small changes in composition are illustrated in FIG. 1, which is a graph of the FCT life versus the composition of the coating. Small additions of Zr, Hf, Y, Si or rare earth elements such as Ce, Pr, Nd, Pm or Sm either alone or in combination in amounts as little as 0.1 atomic percent (a/o) up to about 1.2 a/o, but preferably no greater than 1 a/o, are known to improve the spallation resistance of the NiAl. These elements preferably are added substitutionally, so as not to affect the NiAl matrix; however, fine precipitates typically form in the matrix. FIG. 1 illustrates, for example, that a small increase in the preferable amount of Zr from 0.2 a/o to 0.4 a/o dramatically increases the FCT life of substantially stoichiometric NiAl from about 250 life cycles at about 0.2 a/o to about 450 FCT life cycles at 0.4 a/o. The Zr forms "pegs" in the surface of the bond coat that improve the spallation resistance of the coating by increasing resistance to crack propagation. The other elements, Hf, Y and Si or the rare earths, also improve the spallation resistance of the coat. The exact mechanism for improved spallation resistance caused by these alloys has not been positively identified, and it may be the same mechanism resulting from the use of Zr or a different mechanism.

Cr is an addition known to affect the spallation resistance of the bond coat. It is an optional element and may be included in amounts up to 15 a/o, but preferably is included in amounts of 10 a/o or less. At low concentrations of Cr, the Cr is present in the protective NiAl β-phase as a solid solution strengthener. It is known to promote the formation of the very desirable α-alumina along the surface of the coating. As the amount of Cr increases, fine precipitates of α-Cr and β'-Heusler phases are formed in the NiAl β-phase. At about 10 a/o Cr, the coating includes about 5 volume percent of these finely dispersed phases after heat treatment.

Another major factor on the FCT life of a TBC system using a substantially stoichiometric NiAl bond coat applied by a thermal spray is illustrated in FIG. 2, which depicts the effect of the surface finish of the bond coat. A rough surface finish has been desirable for some bond coats to increase the available surface area at the interface between the thermal barrier coating and the bond coat. The rough surface finish is believed to assist in forming a mechanical interlock between the bond coat and the TBC, thereby strengthening the system by prolonging the life before spallation. Thus, an as-sprayed condition that normally provides a rough surface finish for the bond coat has been desirable, particularly when a thermally sprayed TBC is to be applied over the bond coat.

However, FIG. 2 illustrates the effect of a smooth surface finish achieved by grinding which produces a coating having a longer FCT life when the TBC is applied using EB-PVD over the substantially stoichiometric NiAl bond coat. A substantially stoichiometric NiAl coating of the present invention in the as-sprayed condition having a surface finish in the range of about 125–250 microinches had a FCT life of about 260 cycles, whereas a smoother substantially stoichiometric NiAl coating having a surface finish of about 16–32 microinches produced by grinding had a FCT life of about 450 cycles. Because of the brittle nature of the NiAl coating, it is easy to fracture and chip; thus not all methods of improving the surface finish are acceptable. For example, single point machining would not be a suitable method for improving the surface finish of such a coating. However, carefully controlled grinding or peening of the coated surface will produce the required finish without damaging the coating prior to application of the TBC. The smooth surface finish in the range of 16–32 microinches was produced by grinding, but surface finishes having similar smoothness or smoother surface finishes can also be achieved by such well known techniques as tumbling, vapor honing, grit-blasting, electropolishing or abrasive media flow. The preferred surface finish produced by one of these mechanical methods is preferably 125 microinches or smoother.

FIG. 3 is a graph that represents the effects of environmental coating thickness on the surface finish of a NiAl coating applied by the HVOF process. HVOF processes are typically used to apply coatings in thicknesses from about 0.0005" to about 0.012". A coating thicker than the minimum provides an improved FCT Life, and coatings with acceptable FCT Life cycle values are obtained by applying a coating in the thickness of about 0.001" to about 0.005". As shown in FIG. 3, by controlling the coating thickness in the range of from about 0.002" to about 0.004", the FCT Life was about 300 cycles for the coating having a thickness of 0.002", and about 420 cycles for the thicker coating. Thus, while a coating in the thickness range of between about 0.002–0.004" is preferred, a thicker coating, from about 0.003–0.004" is most preferred.

Figure 5:
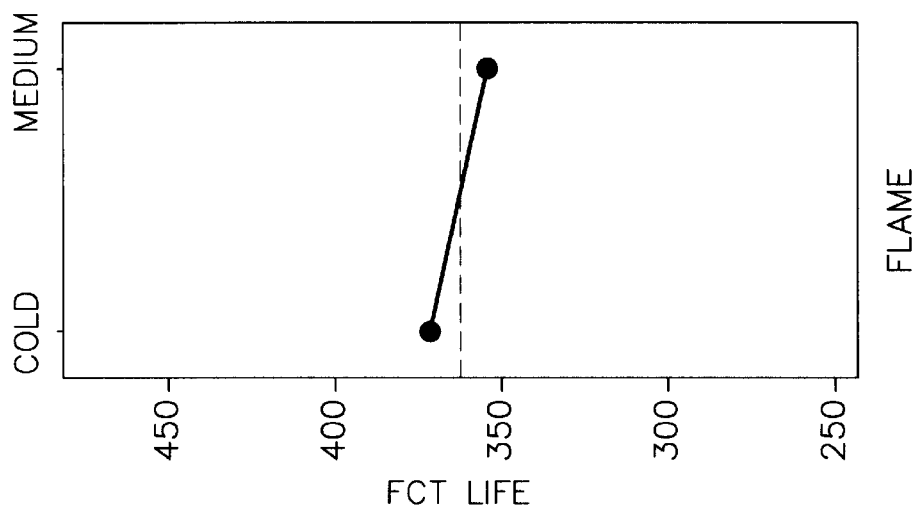
FIG. 5 is a graph that depicts the effects of flame temperature on the FCT Life of a thermal barrier coating system using a NiAl bond coat applied by HVOF.
Figure 4:
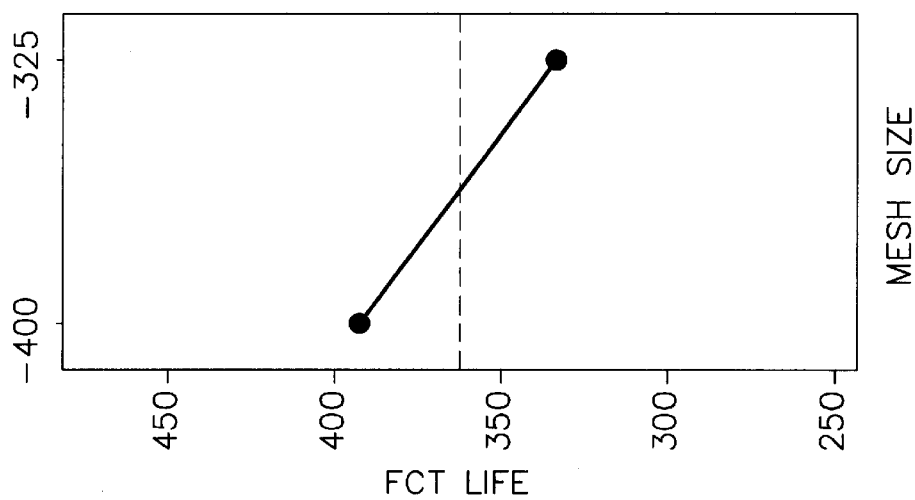
FIG. 4 is a graph that depicts the effects of particle mesh size on the FCT Life of a thermal barrier coating system using a NiAl bond coat applied by HVOF.

Two other factors that have an impact on the FCT life of a NiAl coating applied by the HVOF process are the mesh size of the particles used in the thermal spray operation and the flame temperature of the spray used to apply the coating. FIG. 4 represents the effect of the mesh size, while FIG. 5 represents the effect of the flame spray temperature.

As the particle sizes become finer, the FCT Life improves. Of course, as the particle sizes become smaller, the surface finish of the coating also improves. Surprising, however, simply modifying the particle size, which will affect the surface finish, has less of an effect on the FCT Life of the coating than does the modification of the surface finish by a mechanical operation, such as grinding, discussed above. While the improved surface finish resulting from particles of finer size produces an improved FCT Life, the improvement is not as striking as when the surface finish is improved by a mechanical working operation. While this is not fully understood, the mechanical working operations may, in addition to improving the surface finish, reduce stresses present in the as-sprayed coating, thereby having a more significant impact upon the FCT Life. As shown in FIG. 4, a particle mesh size of about 10–37 micron produced a NiAl coating having a FCT Life of about 380 cycles. A coating produced with particles having a size of about 10–44 microns had a FCT Life slightly lower, about 240 cycles. The as-sprayed surface finish of the coating produced with 26–37 micron particles was in the range of about 135–175 microinches. A substantially stoichiometric coating produced with slightly larger −325/+500 mesh particles yielded a rougher as-sprayed surface in the range of about 150–210 microinches. Thus, while coatings producing acceptable surface finishes can be obtained using powders in the range of from about 10–44 microns, NiAl coatings preferably are applied by using powders in the range of 10–37 microns.

The flame temperature may also have an effect upon the FCT Life of a substantially stoichiometric NiAl coating applied by an HVOF method. Thermal spray methods include HVOF, LPPS, APS and D-gun. The LPPS technique melts particles in an atmosphere largely devoid of oxygen. D-gun or detonation-gun is essentially controlled explosion in which the particles forming the coating are propelled in the direction of the substrate. HVOF is a technique in which particles are heated by a fuel burned in the presence of oxygen. In order to support complete combustion of the fuel, an excess of oxygen must be present, and this provides the hottest flame. However, the presence of the excess oxygen can result in oxidation of the particles that form the coating. Furthermore, the fuel used can affect the quality of the coating. Hydrocarbon fuels, while producing hotter flame temperatures produce adverse by-products that can result in coatings that have undesirable contaminants. Additionally, even when burned using a reducing flame, these fuels do not fully consume the available oxygen so that undesirable oxidation of the particles can occur. Finally, the gases produced by a hydrocarbon fuel using a reducing flame have low thermal conductivity, which adversely affects heat transfer from the flame to the particles. Thus, even though the hydrocarbon fuel produces a hotter flame, the benefit of this flame is lost as the particles are cooled by the gases as they are propelled toward the substrate. These effects are undesirable, and produce poor coatings having a reduced FCT Life. Hydrogen, used as a fuel, has been found to produce a cleaner coating with improved spallation resistance, even though the flame temperature produced by a hydrogen fuel is lower than that achieved by a hydrocarbon fuel. Hydrogen has a higher affinity for oxygen than do hydrocarbon fuels. To assure that there is no oxidation of the heated particles, it is necessary to provide a reducing flame by controlling the flame combustion so that there is an excess of hydrogen. A ratio of hydrogen to oxygen greater than 2:1 produces a coating that is cleaner. Stated in another way, at a 3:1 hydrogen; oxygen ratio, 50% excess hydrogen is available in the fuel to assure a reducing flame. As the excess hydrogen is decreased, there is an increasing likelihood that oxygen can react with one of the added elements, such as Zr to form a Zr oxide, and negate the positive effects of the addition of the element in the coating.

The reaction of oxygen with these elements occurs as the excess hydrogen available approaches 40%. Thus to achieve the desired coating, it is necessary to maintain the level of excess hydrogen above about 40%. However, reduced oxygen to support combustion results in a lower flame temperature. A gun having a convergent/divergent nozzle was used to apply the coatings of the present invention. A METCO DJ2600 was used to apply the coating, but other guns having a convergent/divergent nozzle are expected to provide similar results. Straight bore HVOF guns, such as TopGun and JetKote can also be used. However, the chemistry of the powder and/or the stoichiometry of the flame must be adjusted for each gun/fuel combination. At about 50% excess hydrogen, the flame temperature at the combustion head is about 4058° F., which drops to about 2979° F. at the exit of the convergent/divergent nozzle used to apply the coating by the HVOF process, while the gas velocities increase from about 1270 meters per second at the combustion head (convergent) to about 2500 meters per second at the exit (divergent). The powder velocity at the exit is about 380 meters per second. Even with the lower flame temperature, the combustion of hydrogen does not result in a significant reduction of temperature in the particles due to the higher thermal conductivity of the hydrogen combustion. It is preferred that the hydrogen:oxygen ratio be in the range of about 3:1, and most preferably in the range of about 4:1. FIG. 5 shows the slight improvement resulting from a flame temperature decrease from medium, nonoxidizing such as with a 3:1 hydrogen to oxygen ratio to a cool, non-oxidizing temperature. While the effect of flame temperature provides a slight improvement for FCT Life for HVOF process, there will be little effect on the LPPS process in which the method is carried out in an atmosphere that is largely devoid of oxygen. By extension, this advantage would not be available to any thermal spray process performed in a vacuum or in which oxygen is displaced or substantially consumed.

Despite the differences between HVOF and LPPS spray techniques, when both techniques are used to provide a clean coating, that is substantially free from oxidation, there is little difference expected in the performance of such coatings. Substantially stoichiometric NiAl coatings applied by each technique, while maintaining other variables constant, have about the same FCT Life.

Since the thermal spray techniques provide a coating that is not fully bonded metallurgically, it is necessary to fully develop the metallurgical bond by heat treating the substrate with the applied coating. This heat treatment is performed in the temperature range of from about 1700° F. to about 2100° F. for about 1 to about 16 hours. The heat treatment is performed in an inert gas atmosphere or under a vacuum to minimize oxidation and protect the surfaces of the parts. Although longer times are used for lower temperature heat treatments, the heat treatments performed at higher temperatures, above about 2000° F. provide coatings with improved FCT Life. Preferably, the heat treatment is performed between about 2000° F. to about 2100° F. for about 2 hours. The preferred heat treatment of 2000° F. provides a coating with an improved FCT life as compared to a coating receiving a heat treatment of 1800° F.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for applying a substantially stoichiometric NiAl coating to a superalloy turbine component, comprising the steps of:

providing a superalloy turbine component comprised of a material selected from the group consisting of a nickel-based superalloy and a cobalt-based superalloy;

providing a powder having a preselected size of substantially stoichiometric NiAl and Cr, with minor additions of at least one element selected from the group consisting of rare earth elements and Zr, and combinations thereof;

applying the powder to a substrate of the component to provide a coating of preselected thickness using a high velocity oxy-fuel (HVOF) process with hydrogen as a fuel, having a reducing flame; and heat treating the component having the coating applied to the substrate at a preselected temperature of from 1700–2100° F. for a preselected time of from about 1–16 hours to achieve a sound metallurgical bond between the substrate and the coating.

2. The method of claim 1 wherein the step of providing a powder of preselected size includes providing powder in the size range of from about 10 to about 44 microns.

3. The method of claim 1 wherein the step of providing a powder of preselected size includes providing powder in the size range of about 10 microns to about 37 microns.

4. The method of claim 1 wherein the step of providing a powder of substantially stoichiometric NiAl, sufficient Cr to promote the formation of surface α-alumina, and minor additions of elements selected from the group consisting of rare earth elements and Zr, and combinations thereof includes providing Zr, in atomic percent, in amounts of about 0.1%–1.2%.

5. The method of claim 4 wherein the step of providing a powder of substantially stoichiometric NiAl, sufficient Cr to promote the formation of surface α-alumina, and minor additions of elements selected from the group consisting of rare earth elements and Zr, and combinations thereof includes providing Zr, in atomic percent, in amounts of about 0.2–0.4%.

6. The method of claim 1 wherein the step of providing a powder of substantially stoichiometric NiAl, sufficient Cr to promote the formation of surface α-alumina, and minor additions of elements selected from the group consisting of rare earth elements and Zr, and combinations thereof includes providing minor additions of elements selected from the group consisting of Ce, Pr, Nd, Pm, Sm and Zr and combinations thereof in amounts, in atomic percent, of about 0.1%–1.0%.

7. The method of claim 1 including the additional step of mechanically smoothing the surface finish of the thermally sprayed coating to provide a surface finish of 125 microinches or smoother.

8. The method of claim 7 wherein the additional step of mechanically smoothing the surface finish is performed by grinding.

9. The method of claim 7 wherein the additional step of mechanically smoothing the surface finish is performed by peening.

10. The method of claim 1 wherein the step of applying the powder to a substrate of the component to provide a coating of preselected thickness includes providing the powder to achieve a coating thickness in the range of from about 0.001" to about 0.005".

11. The method of claim 10 wherein the step of applying the powder to a substrate of the component to provide a coating of preselected thickness includes providing the powder to achieve a coating thickness in the range of from about 0.003" to about 0.004".

12. The HVOF process of claim 1 wherein a hydrogen fuel is burned in the presence of oxygen, the ratio of hydrogen to oxygen is greater than 2:1.

13. The HVOF process of claim 1 wherein a hydrogen fuel is burned in the presence of oxygen, the ratio of hydrogen to oxygen is greater than about 3:1.

14. The HVOF process of claim 1 wherein a hydrogen fuel is burned in the presence of oxygen, the ratio of hydrogen to oxygen is greater than about 4:1.

15. The method of claim 1 wherein the step of heat treating the component having the coating applied to the substrate at a preselected temperature in the range of from 1800° F. to about 2000° F. for about 2 hours in a substantially oxygen-free atmosphere.

16. A method for applying a thermal barrier coating system having a substantially stoichiometric NiAl bond coat that includes Cr to a superalloy turbine component to achieve an improved furnace cycle test (FCT) Life, comprising the steps of:

providing a superalloy turbine component comprised of a material selected from the group consisting of a nickel-based superalloy and a cobalt-based superalloy;

providing a powder having a size in the range of about 10 microns to about 37 microns of substantially stoichiometric NiAl, sufficient Cr up to a maximum of about 10 atomic percent to promote the formation of at least surface α-alumina on the NiAl, and additions of up to 1.2 atomic percent of at least one element selected from the group consisting of Ce, Pr, Nd, Pm Sm and Zr, and combinations thereof;

applying the powder to a substrate of the component to provide a coating of from about 0.003" to about 0.004" thick with a HVOF process using hydrogen as a fuel having a reducing flame;

mechanically working the coating to provide a surface finish of 125 microinches or smoother; and heat treating the component having the coating applied to the substrate at a temperature from about 2000° F. to about 2100° F. for a time of 1 to about 16 hours to achieve a sound metallurgical bond between the substrate and the coating.

17. The method of claim 16 wherein the step of providing a powder of substantially stoichiometric NiAl, about 10 atomic percent to about 15 atomic percent Cr to additionally promote the formation of fine precipitates of α-chromium and β' Heusler phases within the NiAl β-phase, and minor additions of elements selected from the group consisting of Ce, Pr, Nd, Pm Sm and Zr, and combinations thereof includes providing Zr, in atomic percent, in amounts of about 0.2–0.4%.

* * * * *